T. R. TIMBY.
Discharging Guns by Electricity.
No. 35,847.
4 Sheets—Sheet 1.
Patented July 8, 1862.
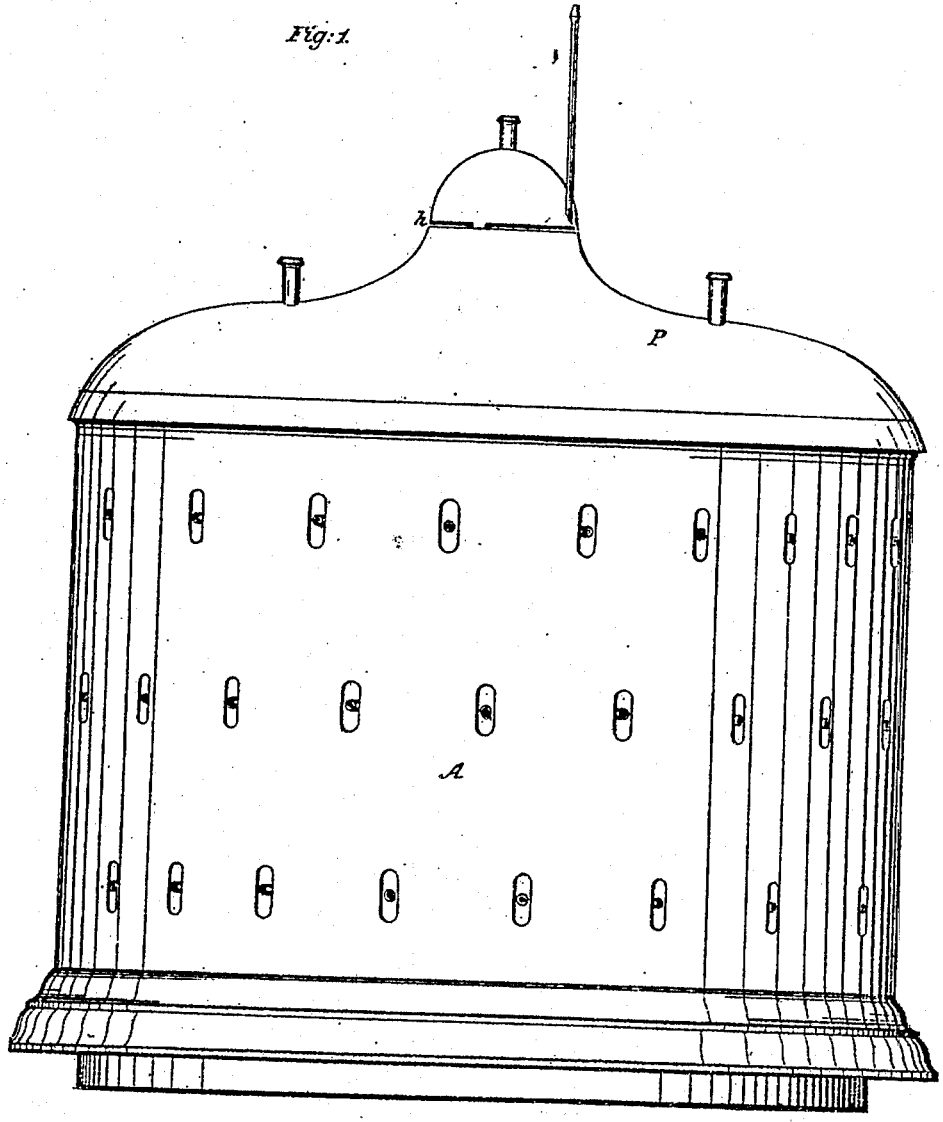

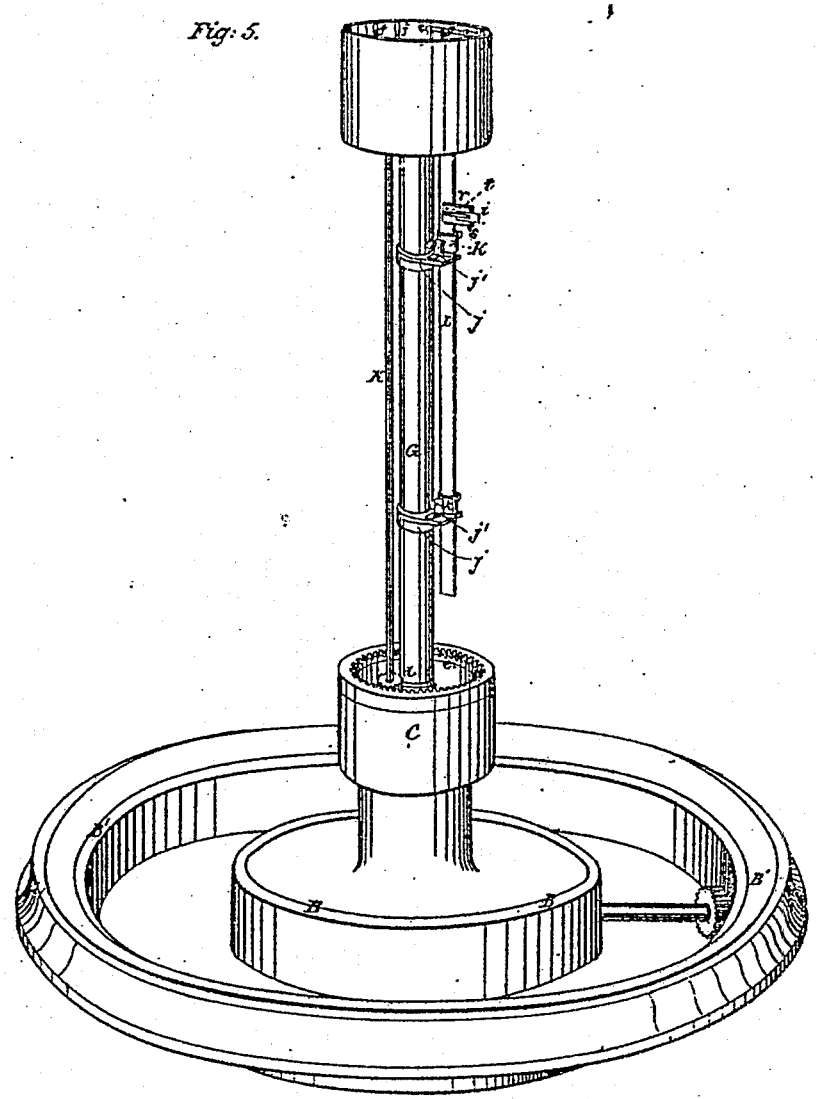

T. R. TIMBY.
Discharging Guns by Electricity.

No. 35,847.

4 Sheets—Sheet 3.

Patented July 8, 1862.

Witnesses.
M. Thayer.
A. B. Little.

Inventor.
Theodore R. Timby.

T. R. TIMBY.
Discharging Guns by Electricity.

No. 35,847.

4 Sheets—Sheet 4.

Patented July 8, 1862.

Witnesses.
M. Hayes.
A. B. Little.

Inventor.
Theodore R. Timby.

UNITED STATES PATENT OFFICE.

THEODORE R. TIMBY, OF WORCESTER, MASSACHUSETTS.

IMPROVEMENT IN DISCHARGING GUNS IN REVOLVING TOWERS BY ELECTRICITY.

Specification forming part of Letters Patent No. 35,847, dated July 8, 1862.

*To all whom it may concern:*

Be it known that I, THEODORE R. TIMBY, of Worcester, in the county of Worcester and State of Massachusetts, have invented a Method of Firing Guns by Electrical Agency, particularly applicable to my revolving tower, to be placed on land or water for offensive or defensive warfare; and I do hereby declare that the following is a full, clear, and exact description of the same, reference being had to the accompanying drawings, making a part of this specification, in which—

Figure 3:
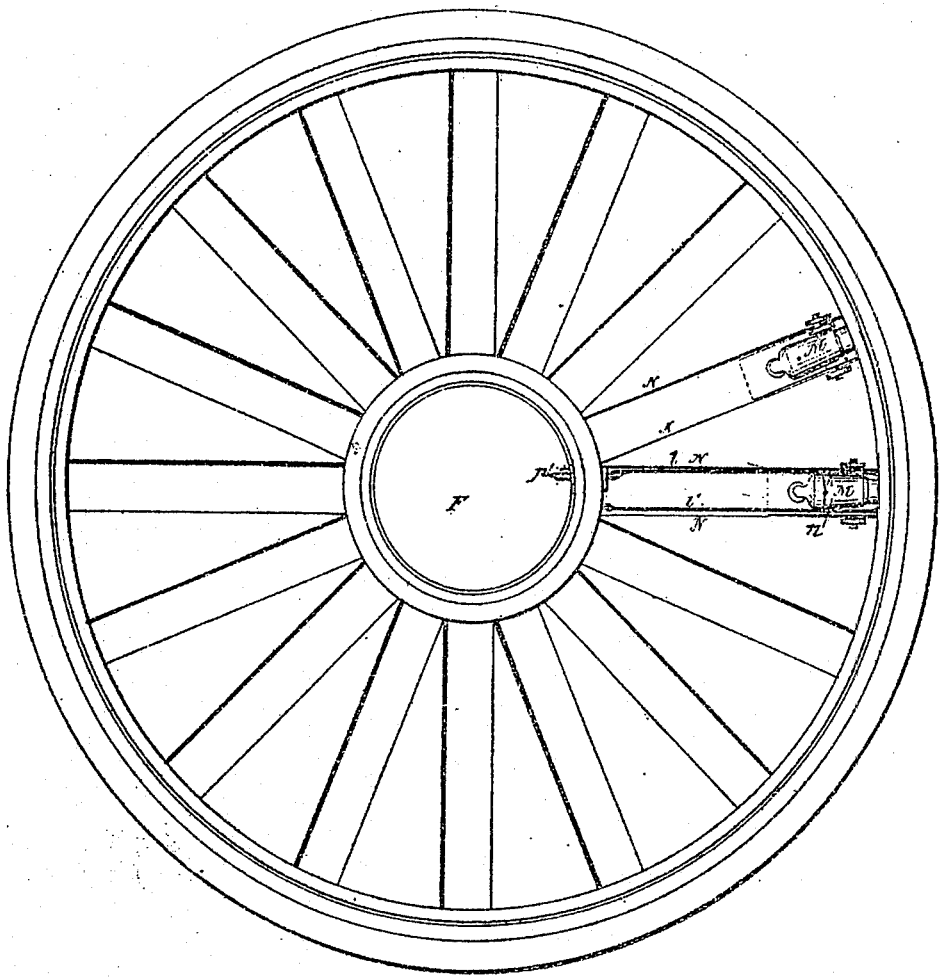
Figure 4:
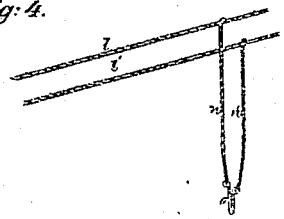
Figure 2:
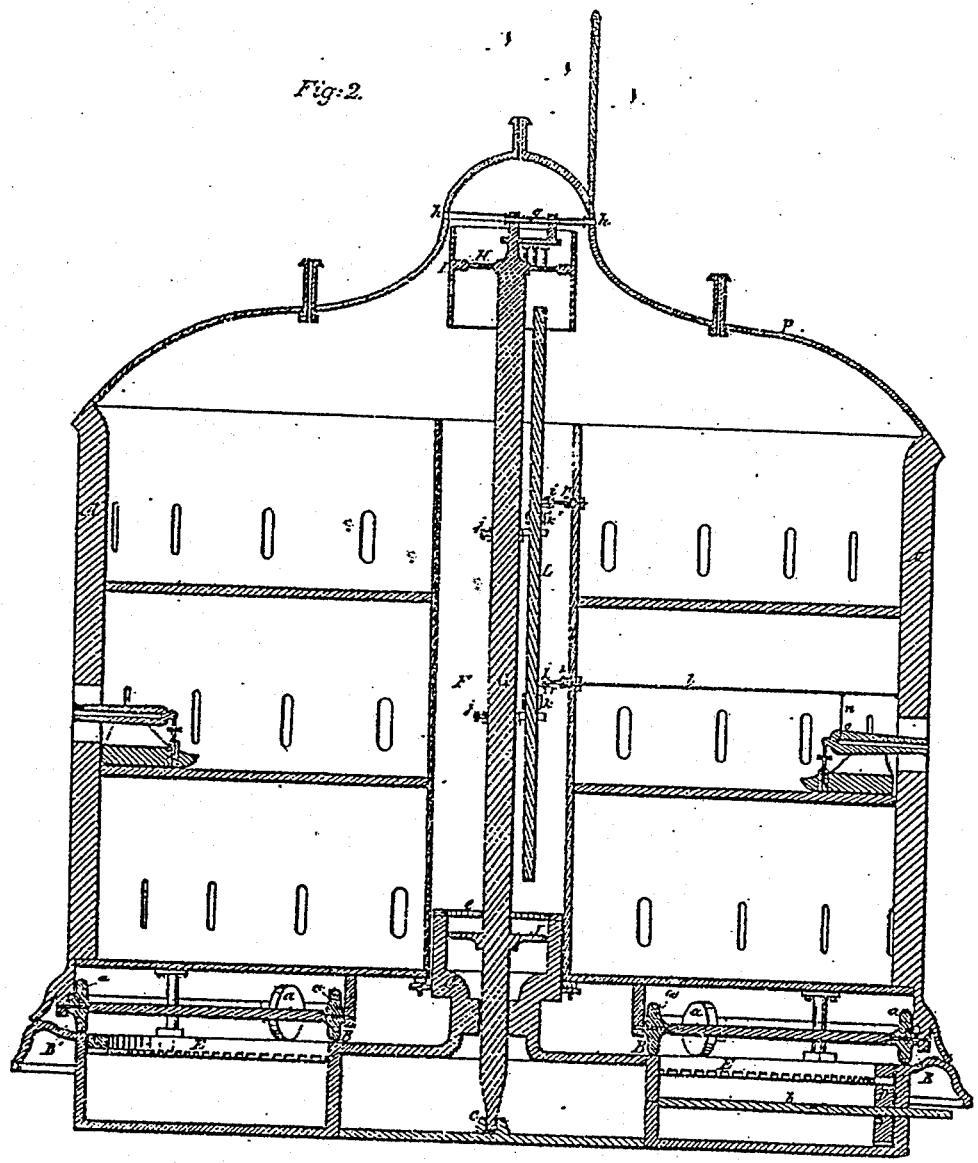

Figure 1 is an elevation of the tower, showing the embrasures and lookout; Fig. 2, a vertical section of the same and its operating mechanism; Fig. 3, a plan of a tier of guns, presenting also a view of the conducting-wires; Fig. 4, a detailed view of the conducting and platinum wires; and Fig. 5, a perspective view of the bed-plate or foundation and central shaft, with its appendages.

The nature of my invention consists, first, in arranging a telescopic or other sight or an index on the commander's platform (which is placed on the top of an independently-revolving shaft) in a direct vertical plane over a circuit-closer or a series of them, having metallic connection with a bar attached to, but insulated from, aid revolving shaft, so that the guns shall be discharged at the moment they come successively in the same vertical plane with the said sight or index by reason of coming in contact at that moment with a second circuit-closer attached to, but insulated from, the revolving tower; second, in making the independently-revolving shaft which carries the revolving platform, in connection with the metallic structure of the tower, a part of the electrical circuit; third, in attaching to and insulating from said revolving shaft a vertical bar revolving therewith, to which is metallically attached one or a series of circuit-closers, and which forms another part of the electrical circuit; fourth, in placing the battery on or under the commander's platform, so that it shall revolve therewith, the poles of the said battery being connected with the shaft which carries the said platform and the attached but insulated bar; fifth, in the peculiar construction of the circuit-closers, whereby the circuit is closed and broken automatically; sixth, in the peculiar formation of the platinum wire which communicates fire to the vent of the gun; seventh, in the arrangement of the conducting-wires, whereby, in connection with the platinum wire, the shaft, tower, bar, and circuit-closers, the electrical circuit is completed.

To enable others skilled in the art to make and use my invention, I will proceed to describe its construction and operation.

The tower A is constructed entirely of plates of iron or steel, or its walls may be lined or backed up with timber, and the whole together made of any desirable thickness. It revolves upon railway-tracks B B' based upon strong castings or masonry, sunk in the ground sufficiently if a land-fort, or placed about one-third the altitude of the tower below the deck if used upon water, around the hollow pivot or shaft C, friction-rollers *a a* being interposed by means of the pinion D on the shaft *b*, which meshes with the large gear-wheel E. The shaft *b* extends a proper distance from under the tower to the engine or other motor, which in land-forts is located in a bomb-proof vault.

The tower may or not have a dome, P; but I prefer to use it in all cases.

Through the center of the tower is constructed the well F, through which and the hollow pivot or shaft C extends the vertical shaft G, stepped at *c*, (which step, as well as the pivot or shaft C, is in metallic communication with the walls of the tower,) and bearing upon its upper end the commander's platform H, which is surrounded by the curb I. The upper bearing of this shaft G is found in the hollow shaft C, against which the collar J bears, which last not only affords an additional metallic communication between the said shaft and the walls of the fort, but serves as a step for the lower end of the shaft K, which is provided with the pinion *d*, meshing with the circular rack *c* and with the hand-wheel *f* on its upper end, above the platform H, which platform serves as a bearing for the upper end of the said shaft K.

On the platform H is arranged the sight or index *g*, in the same horizontal plane with the lookout *h* and in a vertical plane directly over the circuit-closers *i i'*, which are in metallic connection with the bar L, which is attached to (by clamps *j j'*,) but insulate from, (by the insulating material *k*,) the shaft G. Another condition governing the arrangement of the sight or index is that it shall be radiant to the central shaft, C, and as the guns M slide in and out of battery upon radial ways N, both the sight or index and guns may be brought into the same vertical plane.

Over the guns, and also radially, are arranged the conducting-wires *l l'*, the outer ends of which are attached to, but insulated from, the metallic structure of the wall of the tower, from which depend the wires *n n'*, metallically connected at their lower ends to the platinum wire *o*, which is bent to an acute angle sufficiently sharp to penetrate the fuse or vent of the gun. (See Fig. 4.) Of the inner ends of the conducting-wires *l l'*, that one, *l*, to which the circuit-closer *p'* is attached is insulated from the metallic structure of the tower, while the other, *l'*, has a metallic connection with it.

The circuit-closers, of which the bar L bears as many as the tower has tiers of guns, and the walls of the well F as many as there are guns in all the tiers, to which latter there are connected as many conducting and platinum wires *l l'*, *n n'*, and *o*, consist of metallic tappets pivoted or hinged at their centers to the forked arms *r r*, as seen at *s s*, and they are kept in their normal position by means of springs *t*. This allows the two series of circuit-closers to come in contact in the revolution of the tower or the central shaft, and to freely pass each other. Let us suppose, therefore, that a galvanic battery is on or under the platform H, within the curb I, or at some other convenient location, the guns are discharged at the precise moment required by electrical agency in the following manner: One of the poles of the battery is in permanent metallic connection with the shaft G, and by this means is in connection with the entire metallic structure of the tower. The other pole of the battery is in connection with the bar L, which is insulated from the said shaft and tower by the described or any other suitable means.

The electric circuit is completed at the proper times through the conducting-wires *l l'* whenever the circuit-closers *i p* and *i' p'* come in contact.

As before described, the circuit-closers *i* and *i'* are in metallic contact with the bar L, and the circuit-closers *p* and *p'* are fixed to, but insulated from, the metallic structure of the fort.

The conducting-wires *l l'* inclose in their circuit, by means of the wires *n n'*, the acute-angled platinum wire *o*, which, being inserted in the vent, is ignited, and fires the powder at each closing of the circuit. The branch *l* of the conducting-wires is in contact with the circuit-closer *p'*, and insulated from the tower, and the branch *l'* is in metallic connection with the tower.

The two branches *l l'* being supported at their outer ends by a properly-insulated attachment to the walls of the tower, it will readily be seen that whenever, by the revolution of the tower or the central shaft, the two sets of circuit-closers are brought into contact the circuit of the battery is completed, the current, we may suppose, passing from one pole down through bar L, from circuit-closers *i'* to closer *p'*, thence along conducting-branch *l* and *n*, through platinum wire *o*, thence through *n'* to branch *l'*, to the metallic structure of the tower, and to the other pole of the battery.

The commander is furnished with an electrical switch or brake, by means of which he can at any time throw the battery out of connection with the tower or the bar L, one or both, as desired, so that when the tower or central shaft revolves no electrical current can be established through the several circuit-closers as they come successively into contact; or means may be used to move circuit-closers *i i'* out of the way of contact at such times.

The switch or brake is not here described, as being an instrument well known to electricians.

The size of the platinum wire must be so adapted to the force of the electric current that no perceptible interval of time shall occur between the closing of the circuit and the full ignition of the wire.

By the means thus described the commander of the tower, standing upon his platform, can bring the sight or index to bear upon any particular object or point, and there fix it by means of the hand-wheel *f* and shaft K, when all the guns of the tower will be successively discharged upon that object or point, as the tower revolves by electrical agency, care being taken by the gunners to insert the platinum wire in the vent of each piece as it is loaded; or the tower being stationary, the commander can, by revolving the platform, discharge any gun in the tower in any direction by breaking and closing the circuit at the proper time.

Having thus described my invention and pointed out the manner in which it operates, what I claim therein as new, and desire to secure by Letters Patent of the United States, is—

1. Arranging a telescopic or other sight or an index on a platform capable of revolving independently of the tower in a direct vertical plane over a circuit-closer or a series of them, having metallic connection with a bar attached to, but insulated from, said revolving shaft, as and for the purpose specified.

2. Making the independently-revolving shaft, in connection with the metallic structure of the tower, a part of the electric circuit, as described.

3. Attaching to and insulating from said revolving shaft a vertical bar revolving therewith, to which is metalically attached one or a series of circuit-closers, and which forms another part of the electric circuit, as set forth.

4. Placing the battery on or under the commander's platform, so that it shall revolve therewith, the poles of the said battery being connected with the shaft which carries the said platform and the attached but insulated bar, as and for the purpose described.

5. The described construction of the circuit-closers operated by springs, so as to be allowed to pass each other and then revert automatically to their original position.

6. The form and construction of the platinum wires, whereby the electric circuit is preserved and the vent or fuse penetrated, as set forth.

7. The arrangement of the conducting-wires, whereby, in connection with the tower, the shaft, platinum wires, bar, and circuit-closers, the electrical circuit is completed, as described.

THEODORE R. TIMBY.

Witnesses:
W. MAYER,
EDM. F. BROWN.